(12) United States Patent
Casteras et al.

(10) Patent No.: US 9,994,337 B2
(45) Date of Patent: Jun. 12, 2018

(54) MAGNETOHYDRODYNAMIC INERTIAL ACTUATOR

(71) Applicants: CENTRE NATIONAL D'ETUDES SPATIALES, Paris (FR); Institut National Polytechnique de Toulouse, Toulouse (FR); CENTRE NATIONAL DE LA RECHERCHE SCIENTIFIQUE (C.N.R.S), Paris (FR)

(72) Inventors: Christophe Casteras, Toulouse (FR); Yvan Lefevre, Saint-Jean (FR); Dominique Harribey, Portet sur Garonne (FR)

(73) Assignees: CENTRE NATIONAL D'ETUDES SPATIALES, Paris (FR); INSTITUT NATIONAL POLYTECHNIQUE DE TOULOUSE, Toulouse (FR); CENTRE NATIONAL DE LA RECHERCHE SCIENTIFIQUE (C.N.R.S.), Paris (FR)

( * ) Notice: Subject to any disclaimer, the term of this patent is extended or adjusted under 35 U.S.C. 154(b) by 902 days.

(21) Appl. No.: 14/380,264

(22) PCT Filed: Feb. 15, 2013

(86) PCT No.: PCT/EP2013/053101
§ 371 (c)(1),
(2) Date: Aug. 21, 2014

(87) PCT Pub. No.: WO2013/124225
PCT Pub. Date: Aug. 29, 2013

(65) Prior Publication Data
US 2015/0027244 A1    Jan. 29, 2015

(30) Foreign Application Priority Data
Feb. 21, 2012    (FR) ..................................... 12 51576

(51) Int. Cl.
*B64G 1/00* (2006.01)
*B64G 1/28* (2006.01)
(Continued)

(52) U.S. Cl.
CPC ............... *B64G 1/283* (2013.01); *B64G 1/28* (2013.01); *B64G 1/285* (2013.01); *B64G 1/286* (2013.01);
(Continued)

(58) Field of Classification Search
CPC .......... B64G 1/283; B64G 1/32; B64G 1/286; B64G 1/285; B64G 1/28; G01C 19/14;
(Continued)

(56) References Cited

U.S. PATENT DOCUMENTS 2,856,142 A    10/1958    Haviland
3,133,213 A     5/1964    Ferguson
(Continued)

FOREIGN PATENT DOCUMENTS

DE    10 2008 0222725 A1    11/2009
EP         1 770 404 A2      4/2007
(Continued)

OTHER PUBLICATIONS

Search Report and Written Opinion issued by European Patent Office dated Mar. 19, 2013.

*Primary Examiner* — Victor L MacArthur
(74) *Attorney, Agent, or Firm* — Michael B. Fein; Eckert Seamans Cherin & Mellot, LLC

(57) ABSTRACT

An inertial actuation magnetohydrodynamic wheel (2) comprising a torus-shaped fluid ring (3) filled with a conductive liquid, at least one effective area (24, 26, 28) for setting the liquid into motion, and at least one magnetohydrodynamic pump (4, 6, 8).
The ratio of the set back distance of any magnetic conduction element (24, 26, 28) of the air gap of any electromag-
(Continued)

netic pump (4, 6, 8) over the internal size of the fluid ring (3) is greater than or equal to 0.5 and the fluid ring (3) comprises at least two distinct effective areas (24, 26), for setting the conductive liquid into motion, angularly spaced apart by at least 120°.

11 Claims, 9 Drawing Sheets

(51) Int. Cl.
*H02K 44/08* (2006.01)
*G01C 19/12* (2006.01)
*G01C 19/14* (2006.01)
*H02K 44/16* (2006.01)
*B64G 1/32* (2006.01)

(52) U.S. Cl.
CPC .............. *B64G 1/32* (2013.01); *G01C 19/12* (2013.01); *G01C 19/14* (2013.01); *H02K 44/085* (2013.01); *H02K 44/16* (2013.01); *H02K 2213/03* (2013.01); *Y10T 74/125* (2015.01)

(58) Field of Classification Search
CPC ...... G01C 19/12; H02K 44/16; H02K 44/085; H02K 2213/03; Y10T 74/125
See application file for complete search history.

(56) References Cited

U.S. PATENT DOCUMENTS

| | | | | |
|---|---|---|---|---|
| 3,757,846 | A * | 9/1973 | Herman, Jr. | B01F 13/0809 164/499 |
| 3,984,918 | A * | 10/1976 | Chaney | E21B 47/022 33/366.18 |
| 4,441,375 | A * | 4/1984 | Minohara | G01C 19/20 33/327 |
| 5,413,010 | A * | 5/1995 | Nakanishi | B01F 15/00435 310/156.38 |
| 5,476,018 | A * | 12/1995 | Nakanishi | B01F 15/00435 74/5.46 |
| 6,220,095 | B1 * | 4/2001 | Fennel | G01C 19/14 73/514.08 |

FOREIGN PATENT DOCUMENTS

JP      4055198 A       2/1992
WO      WO 9808054 A1 *  2/1998  .............. G01C 19/14

* cited by examiner

MAGNETOHYDRODYNAMIC INERTIAL ACTUATOR

CROSS-REFERENCE TO RELATED APPLICATIONS

The application is a national stage of International Application No. PCT/EP2013/053101, filed Feb. 15, 2013, which claims the benefit of FR Patent Application Serial No. 1251576, filed Feb. 21, 2012, all of which are hereby incorporated by reference.

The present invention relates to a magnetohydrodynamic inertial actuator intended to be notably used as an accurate actuator element of an Attitude and Orbit Control Subsystem for satellites, and generally a stabilised platform, in which is on board at least such an inertial actuator.

It is known how to use kinetic or reaction wheels in an accurate of Attitude and Orbit Control Subsystem for spacecraft or space vehicles, the size of which may range from that of a space station to that of a nano-satellite, for missions requiring accurate pointing of the platform.

Conventionally, the wheels of an Attitude and Orbit Control Subsystem are used as inertial actuators for modifying the angular momentum of a spacecraft in order to correct the attitude or the pointing or for giving the spacecraft some gyroscopic rigidity, and are each made with a rigid and solid momentum wheel, mounted on roller bearings or on magnetic bearings, and driven by an electric motor.

However, inertial wheels with roller bearings remain with a limited lifetime. Their behaviour around zero velocity also poses problems on a significant number of space missions which require very accurate pointings (observation by satellites from geostationary orbit, for example a Meteosat Third Generation (MTG) satellite). Indeed, in addition to the tribological problems for providing again the ball/track contact within the bearings, the exported reaction torque is non-linear with a small torque jump upon passing from zero velocity due to the stiction torque of the guide bearing. Moreover, the speed of rotation of the wheel is not so well controlled in this operation area.

Wheels with magnetic bearings, as for them, require a complex servo control of the guiding along the active axis of the bearing. The adjustment of the servo control should notably take into account the Eigenmodes of the wheel and of the support. Further, a "stacking" or blocking system has to be considered in order to maintain the rotor during the vibrations when transporting or launching the spacecraft.

In order to overcome these drawbacks, magnetohydrodynamic wheels, based on the setting into rotation of a liquid mass in a fluid loop by a magnetohydrodynamic pump or electromagnetic wheels have been proposed as described in patent applications U.S. Pat. No. 3,133,213 and U.S. Pat. No. 2,856,142.

In this way, the conventional rigid, bulky kinetic or reaction wheel and having wearing parts is replaced by a fluid kinetic or reaction wheel with an almost unlimited lifetime.

Document U.S. Pat. No. 3,133,213, published on May 12, 1964 describes a magnetic structure, common to three magnetohydrodynamic wheels, and producing a magnetic flux at three air gaps. Each air gap is respectively associated with a single and different pair of magnetic poles of a different linear magnetohydrodynamic pump with continuous conduction. Each magnetohydrodynamic pump, respectively associated with a single and different fluid loop, is locally positioned at an area for setting into motion the associated fluid loop, the area for setting into motion being surrounded by the corresponding air gap of the magnetic structure. Each assembly, formed by a magnetohydrodynamic pump, a fluid loop, and an air gap, forms a different magnetohydrodynamic inertial wheel, the inertial axis of the three inertial wheels being orthogonal to each other.

Providing a magnetic structure, shared for producing the magnetic flux required by the magnetohydrodynamic pumps, gives the possibility of saving mass on the magnetic circuit and of simplifying its manufacture.

However, a portion of the magnetic circuit crosses the central holes of the fluid loops, which degrades the use of the central space of the fluid loops for setting up therein useful pieces of equipment such as for example electronic equipment.

Document U.S. Pat. No. 2,856,142 describes a structure for controlling the attitude of a satellite, having three magnetohydrodynamic wheels substantially identical with those described in document U.S. Pat. No. 3,133,213 and differing by the absence of a shared magnetic circuit.

Document U.S. Pat. No. 2,856,142 solves the central congestion problem of the holes of fluid loops by positioning the magnetic structures of each magnetohydrodynamic pump at the periphery of each fluid loop.

However, the wheel structure proposed in document U.S. Pat. No. 2,856,142, like the one described in document U.S. Pat. No. 3,133,213 has the drawback of being sensitive in terms of linear response to the effects of local parasitics of the movement of the fluid, for example related to a defect of the pump, a local defect of the surface of the fluid ring, to some compressibility of the inertial fluid or to a local lack of homogeneity of the conductive liquid.

The technical problem is to reduce the sensitivity of the magnetohydrodynamic wheel to such effects as an inertial actuator.

For this purpose, the object of the invention is an inertial actuator for stabilising and/or pointing a platform along a predetermined direction comprising:

a torus-shaped fluid ring including a central ring hole crossed by a central axis, having an internal size equal to diameter of the ring hole, filled with a conductive liquid and having at least an air gap area, capable of being crossed by magnetic field(s) and having at least one effective area for setting the liquid into motion, and at least one magnetohydrodynamic pump for setting the conductive liquid into motion around the central axis of the fluid ring, each magnetohydrodynamic pump having a single and different air gap, the air gap being associated with a single and different air gap area and with effective areas for setting into motion included in the air gap area, each magnetohydrodynamic pump including a single and different means for generating magnetic field(s) crossing the associated air gap, and including at least a single and different magnetic conduction element, configured for conducting and channelling the magnetic field(s) generated in the effective area(s) for setting into motion, each magnetic conduction element being separated as close as possible to a central axis of the whole of the ring by a distance set back from the magnetic circuit which is specific to it, characterised in that the ratio of the set back distance of any magnetic conduction element of any magnetohydrodynamic pump over the half of the internal size of the fluid ring is greater than or equal to 0.5, preferably greater than or equal to 0.7, and the fluid ring comprises at least two distinct effective areas, for setting the conductive liquid into motion, each centered around one of a respective radial middle half-plane and for which the two radial middle half-planes of two of them are angularly spaced by at least 120°.

According to particular embodiments, the inertial actuator includes one or several of the following characteristics:

the fluid ring comprises a number P greater than or equal to 2 of effective distinct areas for setting the conductive liquid into motion, each centered around a respective radial middle half-plane and angularly spaced apart 2×2 for the two closest neighbouring areas by a pitch, substantially equal to 360° divided by the number P of effective areas;

the magnetohydrodynamic pump(s) is (are) pumps taken from the assembly formed by DC current conduction electromagnetic pumps, AC current conduction electromagnetic pumps, linear induction electromagnetic pumps, annular induction electromagnetic pumps, and spiral induction electromagnetic pumps;

the inertial actuator comprises at least two distinct magnetohydrodynamic pumps, each magnetohydrodynamic pump being associated with a single and different air gap area; and a synchronisation circuit connected to the whole of the magnetohydrodynamic pumps configured for synchronising with each other the intensities of the magnetic fields and/or the intensities of the electric fields respectively generated by the magnetohydrodynamic pumps by minimising the energy consumed by the whole of the magnetohydrodynamic pumps when the conductive liquid rotates with a predetermined set rotational speed;

said at least one magnetohydrodynamic pump is a single annular induction magnetohydrodynamic pump in which the means for generating at least one magnetic field is a stator of an electromechanical machine having several windings positioned around the central axis and along an external circumference of the ring configured so as to be connected to a source of multiphase currents and for generating alternating radial unipolar or multipolar magnetic fields, forming a resultant rotating multipolar magnetic field having a number P of poles, angularly distributed regularly, and the fluid ring comprises a number P of effective areas for setting the conductive liquid into motion, each centered around a respective radial middle half-plane, and spaced out angularly 2×2 for two closest neighbouring areas by a pitch, substantially equal to 360° divided by the number P of effective areas, the radial middle axis of an area coinciding with the axis of a pole of the resulting magnetic field at the same instant;

the actuator further comprises a unit for regulating the frequency of the amplitudes of the currents provided by the source of currents in order to minimise the energy consumed by the magnetohydrodynamic pump when the conductive liquid rotates at a predetermined set rotational speed;

the conductive liquid is a liquid taken from the set formed by liquid gallium, liquid mercury and NaK;

a radial section of the internal envelope of the fluid ring is comprised in the set formed by circles, ellipses, rectangles, squares, rectangles with rounded angles, squares with rounded angles, polygons, polygons with rounded angles and combinations of several of these geometrical shapes;

each magnetohydrodynamic pump comprises a single magnetic conduction element having a first polar end and a second polar end positioned on either side of the air gap so as to form with the air gap a magnetic circuit closed on itself; and each magnetohydrodynamic pump comprises a first magnetic conduction element and a second magnetic conduction element positioned on either side of the air gap in order to form a series with the air gap and the means for generating a magnetic field, a magnetic circuit closed on itself.

The object of the invention is also a platform comprising a supporting structure, one or several massive pieces of equipment positioned on the supporting structure, and at least one inertial actuator as defined above, and in which the size of any of the inertial actuators is comprised between 20 centimeters and a few hundred meters.

According to particular embodiments, the platform includes one or several of the following features:

the inertial actuator is either a kinetic wheel for giving gyroscopic stiffness to the platform, or a reaction wheel for changing the angular momentum or the kinetic energy of the platform around a minimum value, or a gyroscopic actuator for strongly changing the angular momentum of the platform by tilting its wheel.

The invention will be better understood and other advantages thereof will become more clearly apparent upon reading the description which follows of several embodiments of the invention, only given as example and made with reference to the appended drawings wherein.

Figure 1:
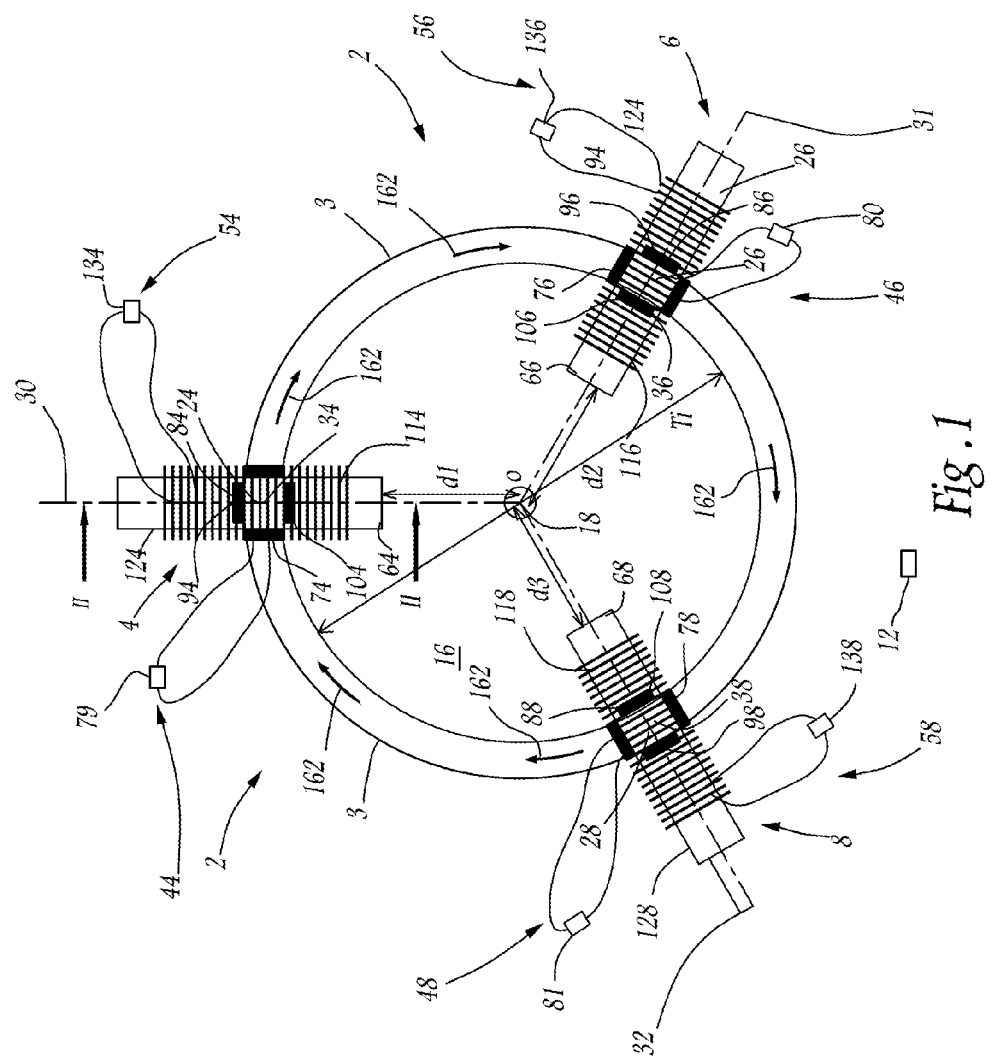
FIG. 1 is a top view of a first embodiment of an inertial actuation magnetohydrodynamic wheel according to the invention.

According to FIG. 1 and to a first embodiment of an inertial actuator, an inertial actuation magnetohydrodynamic wheel 2, for modifying the angular momentum/kinetic energy of a platform in order to correct the attitude or the pointing or for giving the platform some gyroscopic stiffness, comprises a fluid ring 3, three different magnetohydrodynamic pumps 4, 6, 8 and a synchronisation and regulation circuit 12.

The fluid ring 3 has the shape of a hollow torus, and includes a central ring hole 16 crossed by a central axis 18, the internal cross section of the hollow torus forming the fluid ring 3, along any radial half-plane having as a boundary the central axis 18, being rectangular.

The central axis 18 crosses perpendicularly the plane of FIG. 1 in O.

The fluid ring 3 has a radial internal size Ti equal to the diameter of the central hole 16.

The fluid ring 3 is totally filled with a conductive liquid with high density, for example a liquid metal such as liquid gallium, and comprises at least an effective area for setting the conductive liquid into motion, here three distinct effective areas, respectively designated by the references 24, 26, 28.

The three effective areas 24, 26, 28 for setting into motion are separated from each other and without any overlapping, and are each centered around a respective radial middle half-plane 30, 31, 32, two arbitrary consecutive radial middle half-planes being angularly spaced by 120°.

Each effective area 24, 26, 28 is here associated with a single and different air gap area 34, 36, 38 of the fluid ring 3 and each air gap area 34, 36, 38 is capable of being crossed by a different magnetic field.

The magnetohydrodynamic pumps 4, 6, 8 are positioned around the central axis 18 of the fluid ring 3, and each magnetohydrodynamic pump 4, 6, 8 is respectively associated with a single air gap area, and here particularly with a single different effective area 24, 26, 28 for setting the liquid into motion.

Each magnetohydrodynamic pump 4, 6, 8 is here a pump of the DC current conduction type and respectively includes a single and different means for generating a specific electric field for conduction 44, 46, 48, a single and different means for generating a specific magnetic field 54, 56, 58, and a single and different element for magnetic conduction 64, 66, 68.

Each means for generating a specific conduction electric field 44, 46, 48 respectively includes a different and single pair of electrodes 74, 76, 78, and a different associated voltage source 79, 80, 81.

The faces of a same pair of electrodes 74, 76, 78 are positioned on either side of the fluid ring 3 above and below, the direction going from below to the top being the same as that of the central axis 18, and only top portions of the electrodes 74, 76, 78 being visible in FIG. 1.

Each pair 74, 76, 78 of electrodes is connected to the terminals of the voltage source 79, 80, 81 which is associated with it.

Each magnetic conduction element 64, 66, 68 respectively comprises an air gap 84, 86, 88 associated with a single and different air gap area 34, 36, 38 of the fluid ring 3 on which is applied the corresponding magnetic field.

Each magnetic conduction element 64, 66, 68 is configured for conducting and channelling through the associated area 84, 86, 88 on the corresponding air gap area 34, 36, 38, the different magnetic field, generated by the associated means for generating a magnetic field 54, 56, 58.

Figure 2:
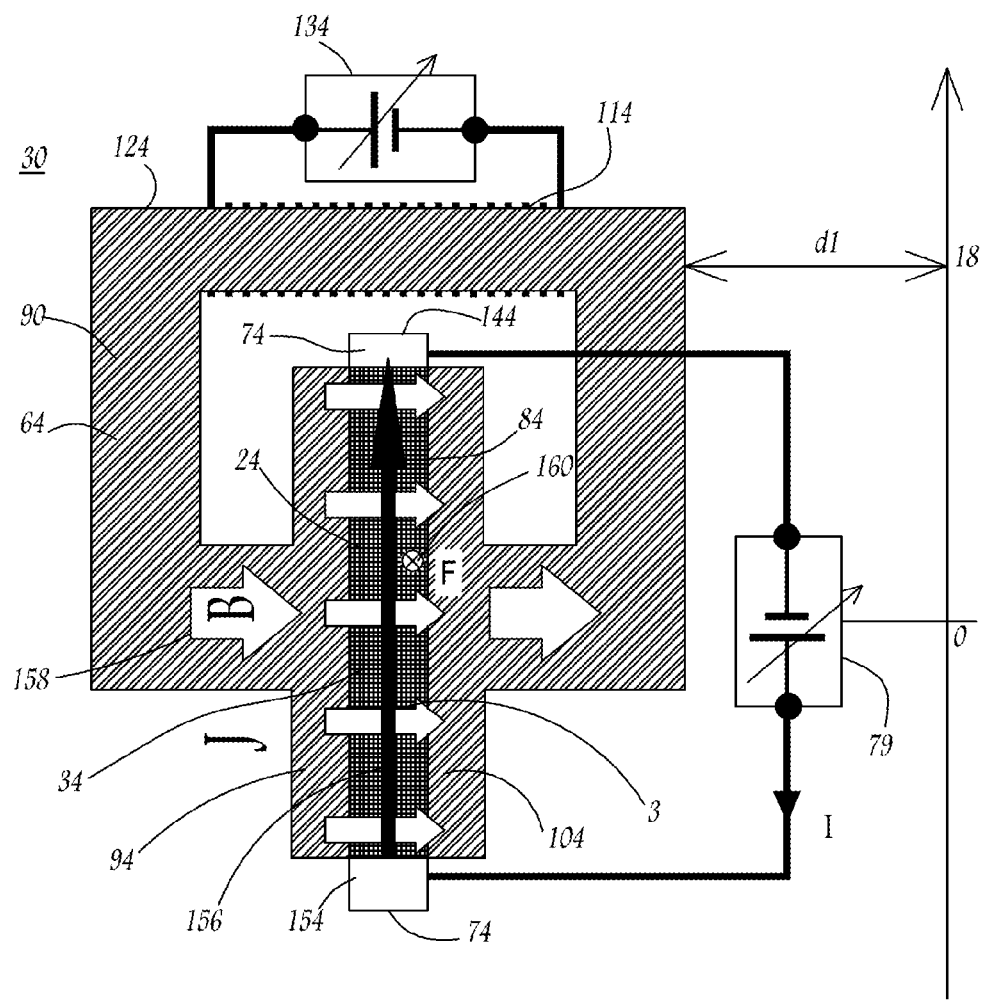
FIG. 2 is a sectional view of a magnetohydrodynamic pump of the magnetohydrodynamic wheel of FIG. 1, cut along the sectional plane II-II.

Each magnetic conduction element 64, 66, 68 is made here in the form of a stack of magnetic metal sheets with non-oriented grains, cut out according to a same pattern 20 as illustrated in FIG. 2. During the assembling of the wheel, the axis for stacking the metal sheets of a conductive element is aligned on a circumferential direction of the fluid ring 3 relatively to the central axis 18, i.e. a polar direction in FIG. 1 relatively to the central point O.

Each magnetic conduction element 64, 66, 68 respectively includes a first polar end 94, 96, 98 and a second polar end 104, 106, 108, respectively delimiting the corresponding air gap 84, 86, 88, and positioned radially on either side of the associated air gap area 34, 36, 38 by surrounding the latter as close as possible in order to form with the air gap area 34, 36, 38 a magnetic circuit closed on itself.

Each means for generating a specific magnetic field 54, 56, 58 respectively comprises an induction coil 114, 116, 118, wound around a portion 124, 126, 128 of the associated magnetic conduction element 64, 66, 68.

Each induction coil 114, 116, 118 is connected to the terminals of an associated single and different current source 134, 136, 138 belonging to the associated means for generating a magnetic field 54, 56, 58.

Each magnetic conduction element 64, 66, 68 is separated as close as possible to the central axis 18 of the hole 16 of the fluid ring 3 by a set back distance of the magnetic conduction element which is specific to it, respectively designated by d1, d2, and d3.

The inertial actuation magnetohydrodynamic wheel 2 is configured so that the ratio of the set back distance of any magnetic conduction element 64, 66, 68 of any magnetohydrodynamic pump 4, 6, 8 over half the internal radial size Ti of the fluid ring 3 is greater than or equal to 0.5, and preferably greater than or equal to 0.7.

In other words, all the ratios $2*d1/Ti$, $2*d2/Ti$ and $2*d3/Ti$ are greater than or equal to 0.5, preferably greater than or equal to 0.7

The voltage sources 79, 80, 81, respectively the current sources 134, 136, 138 may be modulated over time in terms of voltage amplitudes, respectively current intensities, through controlled signals received on the control terminals.

The synchronisation and regulation circuit 12 is connected to the voltage sources 79, 80, 81 and to the current sources 134, 136, 138 of the whole of the magnetohydrodynamic pumps 4, 6, 8 through connections not shown in FIG. 1.

The synchronisation and regulation circuit 12 is configured in order to synchronise and modulate the intensities of the magnetic fields and the intensities of the electric fields, respectively generated by the magnetohydrodynamic pumps 4, 6, 8, so as to minimise the electric energy consumed by the whole of the magnetohydrodynamic pumps 4, 6, 8 when the conductive fluid rotates at a set rotational velocity.

The intensities of the magnetic fields and the intensities of the electric fields are modulated and synchronised through controls elaborated by the synchronisation and regulation circuit 12 and sent to the voltage sources 79, 80, 81 and to the current sources 134, 136, 138 of the magnetohydrodynamic pumps 4, 6, 8.

The synchronisation and regulation circuit 12 is here positioned outside the fluid ring 3.

As an alternative to FIG. 1, the synchronisation and regulation circuit 12 is positioned inside the fluid ring 3 in the central hole 16.

As an alternative to FIG. 1, each magnetohydrodynamic pump respectively includes a different set of two magnetic conduction elements.

Each set of magnetic conduction elements, associated with a magnetohydrodynamic pump, includes in this case a first magnetic conduction element and a second magnetic conduction element, radially positioned on either side of the associated air gap area, by surrounding it as close as possible in order to form a series with the air gap area and the means for generating a magnetic field, a magnetic circuit closed on itself.

Each means for generating a magnetic field respectively comprises, a permanent magnet positioned between the first magnetic conduction element, and the second magnetic conduction element of the associated set of magnetic conduction elements.

According to FIG. 2, the mechanism for setting the conducted liquid into motion by the magnetohydrodynamic pump 4 of FIG. 1 is illustrated.

The elements of the pump 4 illustrated in FIG. 1 and in FIG. 2 are designated by the same numerical references.

When a first voltage V1 is applied to a first electrode 144 of the pair 74 and a second voltage V2 is applied to a second electrode 154, the first voltage V1 being less than the second voltage V2, an electric field E is generated, oriented in a direction ranging from the first electrode 144 to the second electrode 154, and an electric current J is generated in the metal fluid which flows from the second electrode 154 to the first electrode 144 along a first arrow 156.

At the same time, when a current is generated in the induction coil 114 by the current generator 134, a magnetic field B is generated in the magnetic conduction element 64 which channels the magnetic field B and focusses it through the air gap 84 onto the air gap area 34. Thus an effective magnetic circuit is achieved.

Here in FIG. 2 and as an example the direction of the current in the excitation coil 114 is selected so as to generate a magnetic field B oriented in a direction, ranging from the first polar end 94 to the second polar end 104 and illustrated by a second arrow 158.

Figure 3:
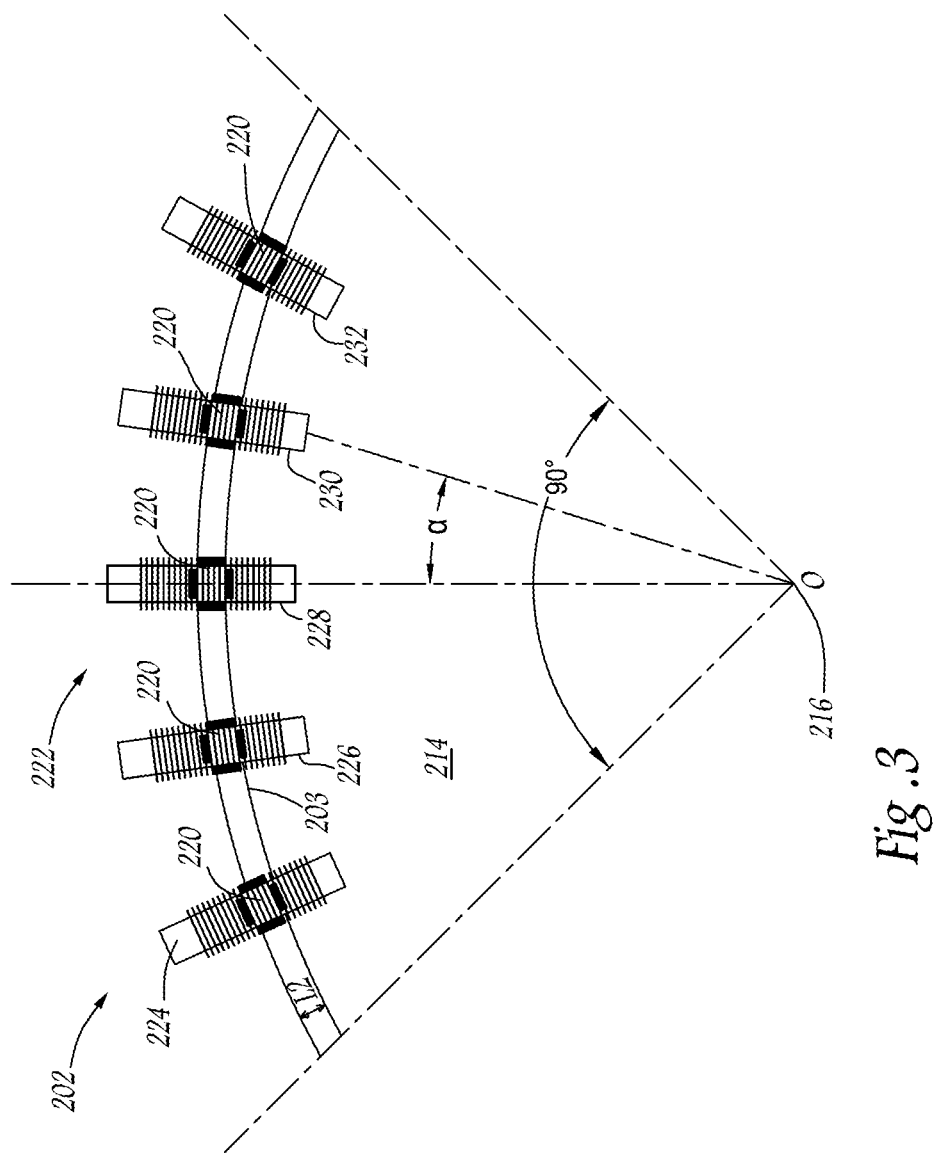
FIG. 3 is a partial view of a second embodiment of an inertial actuation magnetohydrodynamic wheel according to the invention.

Accordingly, a Lorentz force F is generated and applied to the portion of conductive liquid contained in the effective area for setting into motion 24, the direction of the Lorentz force F being directed along an axis perpendicular to the direction of the magnetic field B and to the direction of the electric current J, being oriented in the viewing direction of FIG. 3 and illustrated by an arrow 160 of vector F, seen on end in FIG. 2 running towards the rear.

Because of an assumed strong uncompressibility of the conductive liquid, the Lorentz force F is applied to the whole of the liquid, which will be expressed by a change in its linear momentum proportional to the duration of application of the Lorentz force.

If the conductive liquid is initially at rest, this is expressed by a setting of the liquid into motion in a same direction as the Lorentz Force, which corresponds to setting up rotation in a clockwise direction in FIG. 1 illustrated by a series of arrows 162.

If the liquid has an initial velocity, this is expressed by a change in the initial velocity into a new velocity, the difference between the new velocity and the initial velocity being equal to the oriented product of the Lorentz force with the duration of application of the force.

In the case when, either the polarity of the voltage source 134 of the electrodes 74, or the direction of the current in the induction coil 114, is reversed, the direction of the Lorentz force is changed.

The voltage source 79, 80, 81 and/or the current source 134, 136, 138 of the magnetohydrodynamic pumps 4, 6, 8 being configured for providing voltages, respectively currents, the amplitudes of which may be modified through controls, by the addition to the inertial magnetohydrodynamic wheel 2 of a representative sensor of the speed of rotation of the conductive fluid, it is possible to modify the velocity of the fluid ring 3 and providing a dynamic correction momentum to a platform supporting the inertial wheel.

According to FIG. 3 and to a second embodiment of an inertial actuator, an inertial actuation magnetohydrodynamic wheel 202 comprises a fluid ring 203 having a central hole 214 crossed by a central axis 216, and a high integer number P, here equal to 20, of distinct effective areas 220 for setting a conductive liquid into motion, which fills the fluid ring 203.

Like the fluid ring 3 of FIG. 1, the fluid ring 203 has a shape of a torus and cross section generating the torus, of a rectangular shape, the length L1 of the rectangle of the cross section of the torus being extended along the same direction as the central axis 216 and having a size greater than that of the radial width L2 of the same rectangle.

The distinct effective areas 220 for setting into motion are each centered around a respective radial middle half-plane, and angularly spaced around the central axis 216 according to a regular spacing pitch a, substantially equal to 360° divided by the number P of effective areas, i.e. equal here to 18°.

The magnetohydrodynamic wheel 202 comprises an identical number P of magnetohydrodynamic pumps regularly and angularly spaced according to the angular pitch a.

In FIG. 3, only a set 222 of five neighbouring pumps 224, 226, 228, 230, 232 is illustrated covering an angle at the centre of the fluid ring here equal to 90°. Three other sets of pumps, similar to the set 222 will complete the three other non-illustrated quadrants of the fluid ring 203.

Each magnetohydrodynamic pump of the inertial wheel, in particular each pump taken from the first, second, third, fourth, fifth pumps 224, 226, 228, 230, 232, has the same structure as the magnetohydrodynamic pump 4 described in FIGS. 1 and 2, i.e. it is a linear DC current conduction pump.

Each magnetohydrodynamic pump includes here a specific single and different voltage source for supplying a differential voltage to an associated pair of electrodes, and a specific, unique and different current source for providing current to an associated coil.

The advantage of such a structure like in FIG. 1 is to provide redundancy at the magnetohydrodynamic pumps, which goes in the direction of improving reliability and safety of the inertial wheel.

When the number of magnetohydrodynamic pumps increases, the extent of the dynamic correction range of the inertial wheel increases, and the effects of local parasitics on the fluid motion, for example related to a defective pump, a local surface defect of the fluid ring, some compressibility or a local lack of homogeneity of the conductive liquid, decreased by a smoothing effect.

As an alternative to FIG. 3, a voltage source and/or a current source are shared on a group of magnetohydrodynamic pumps.

For example, a first group of pumps, containing all the regularly separated pumps from each other by an angle of 90° and in particular the first pump 224, is powered by a first voltage source and a first current source, shared in common for the whole of the pumps of the first group.

A second group, a third group, a fourth group and a fifth group of distinct magnetohydrodynamic pumps are defined in the same way as the first group and respectively comprise the second pump 226, the third pump 228, fourth pump 230, and the fifth pump 232.

The second group, the third group, the fourth group and the fifth group are respectively powered by a second voltage source and a second current source, a third voltage source and a third current source, a fourth voltage source and a fourth current source, a fifth voltage source and a fifth current source.

This alternative gives the possibility of saving mass on the electric power supplies of magnetohydrodynamic pumps as compared with the structure described in FIG. 3.

Alternatively, each magnetohydrodynamic pump is replaced with a magnetohydrodynamic pump taken from the assembly formed by the AC current conduction electromagnetic pumps, the linear induction electromagnetic pumps, the annular induction electromagnetic pumps, and the spiral induction electromagnetic pumps or with twisted rotating induction.

According to FIGS. 4 to 7 and a third embodiment of an inertial actuator, an inertial actuation magnetohydrodynamic wheel 302, comprises a supporting structure or case 304, a fluid ring 306, a single magnetohydrodynamic pump 308 including an electric power supply 310, and a unit for regulating 312 the frequency and the intensities of phase currents.

Figure 4:
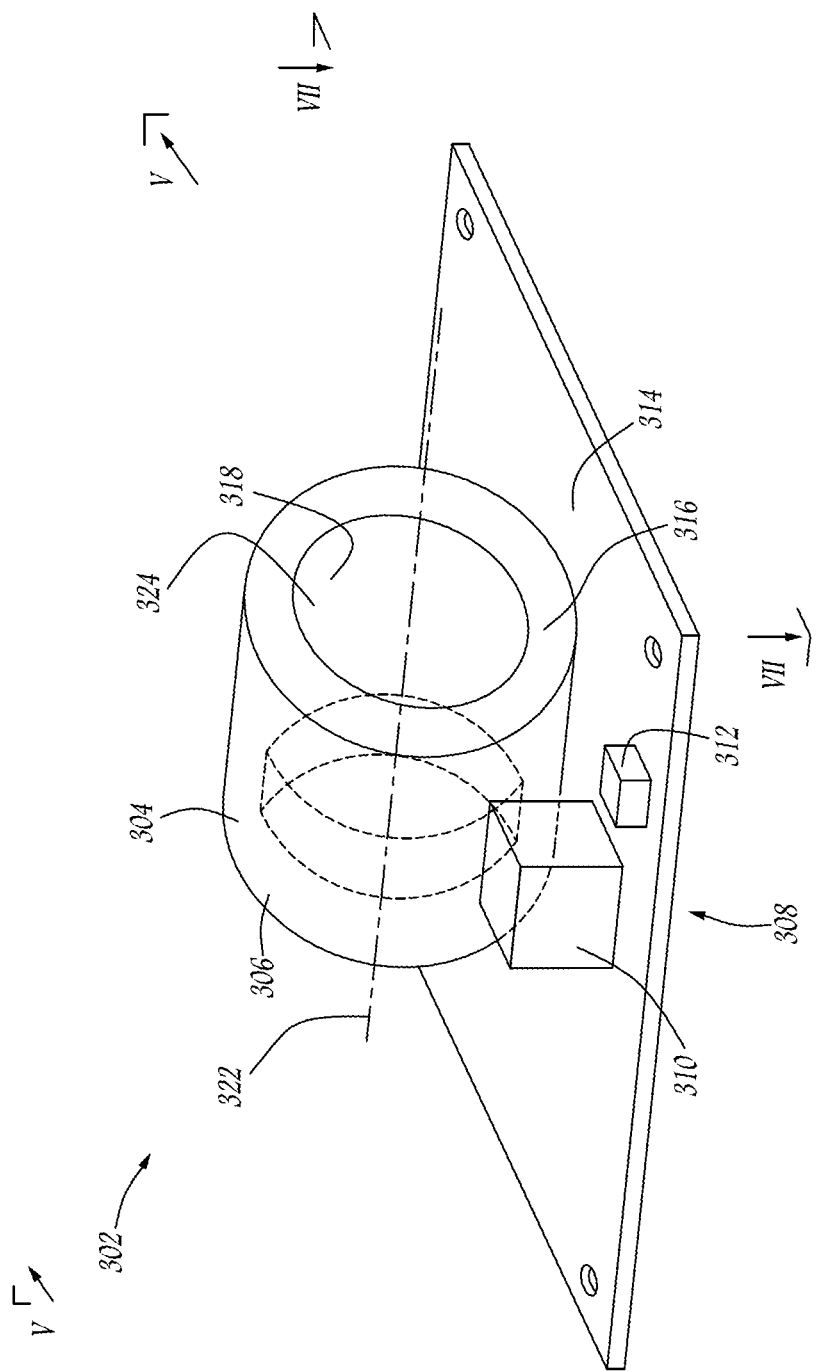
FIG. 4 is a general external view of a third embodiment of an inertial actuation magnetohydrodynamic wheel according to the invention.

According to FIG. 4, the case 304 comprises a plate 314 for mounting the magnetohydrodynamic wheel 302 on a platform face not shown, and an external box 316 which harbours a fluid ring 306, illustrated in dashed lines, and the magnetohydrodynamic pump 308 in its totality except for the electric power supply 310.

The electric power supply 310 and the regulation unit 312 are attached on the surfaces for receiving the mounting plate 314.

When it is assembled to the magnetohydrodynamic pump 308 and to the fluid ring 306 illustrated in dashed lines, the external metal box 316 has the global shape of a first torus with a rectangular generatrix section.

The first torus has cylindrical symmetry about a central axis 322 and has a first central hole 324.

Figure 5:
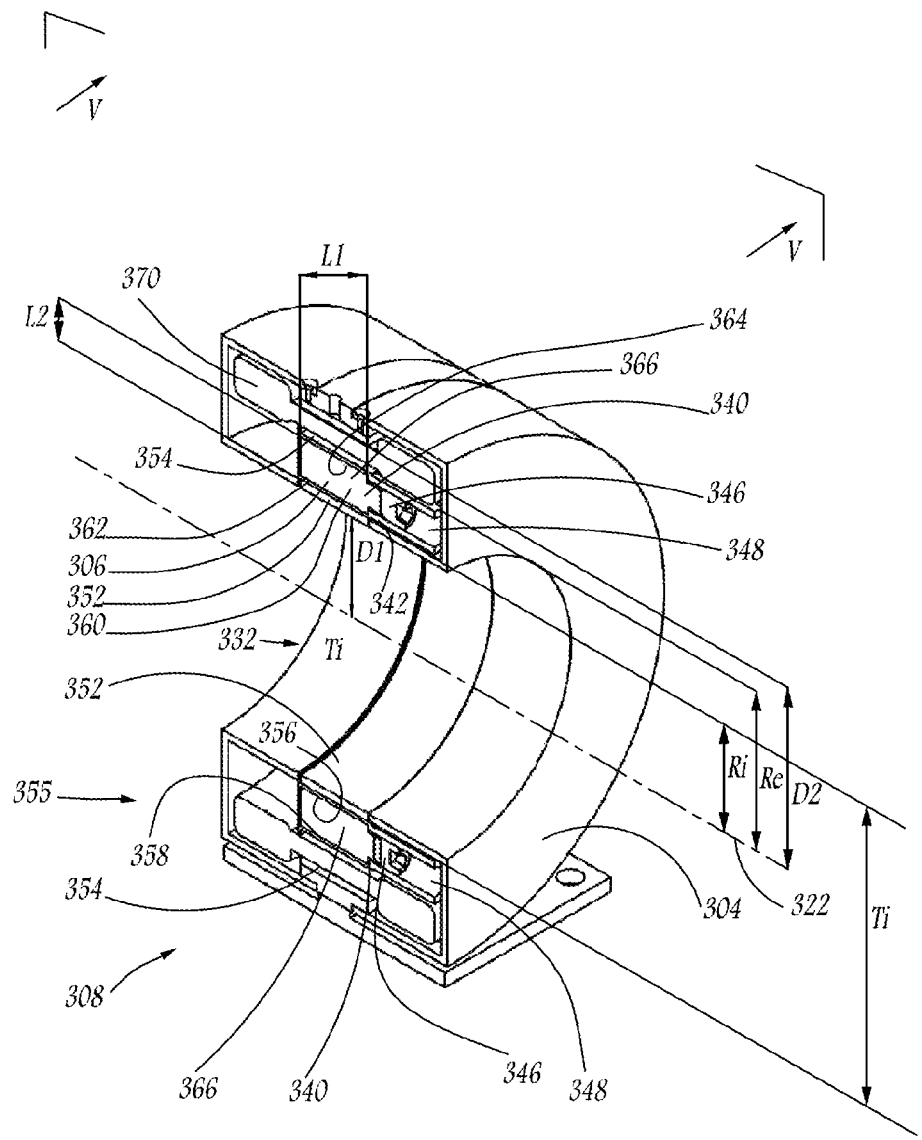
FIG. 5 is a perspective view of half of the inertial actuation magnetohydrodynamic wheel of FIG. 4, cut into two along the sectional plane V-V.
Figure 6:
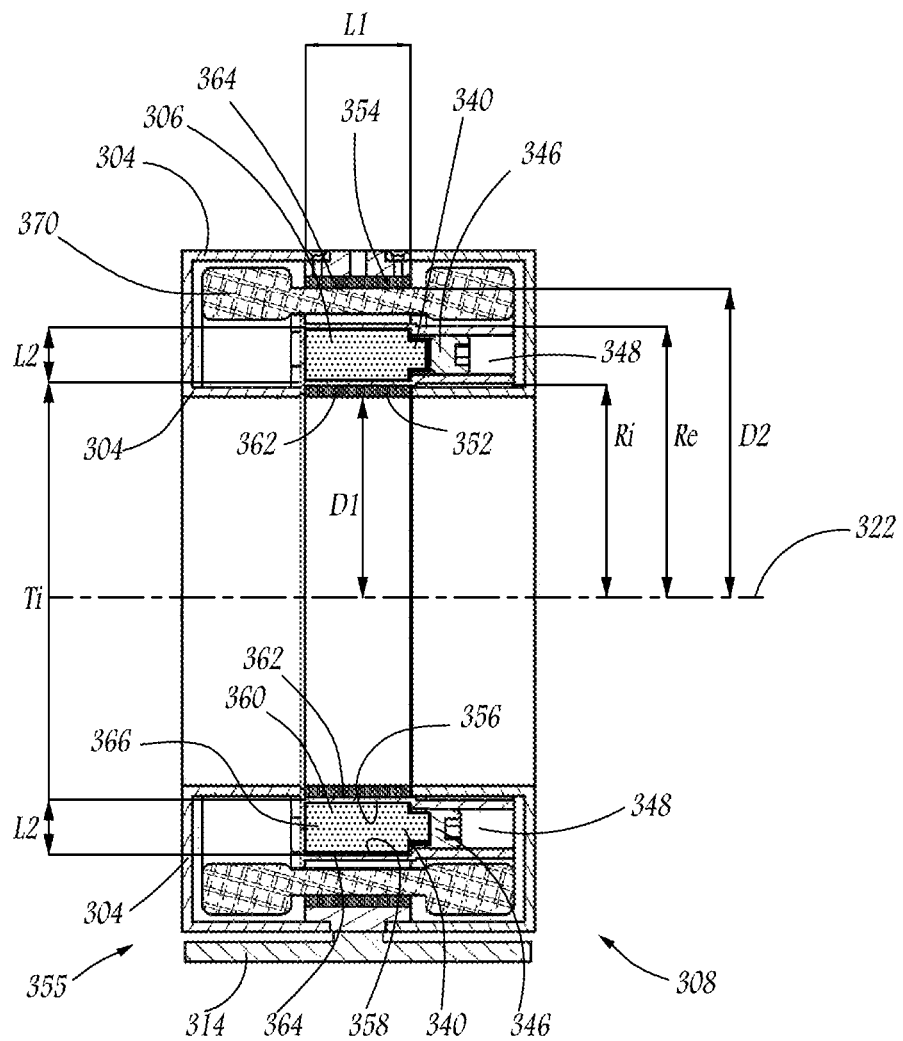
FIG. 6 is a sectional view of the inertial actuation magnetohydrodynamic wheel of FIG. 4 cut along the sectional plane V-V.
Figure 7:
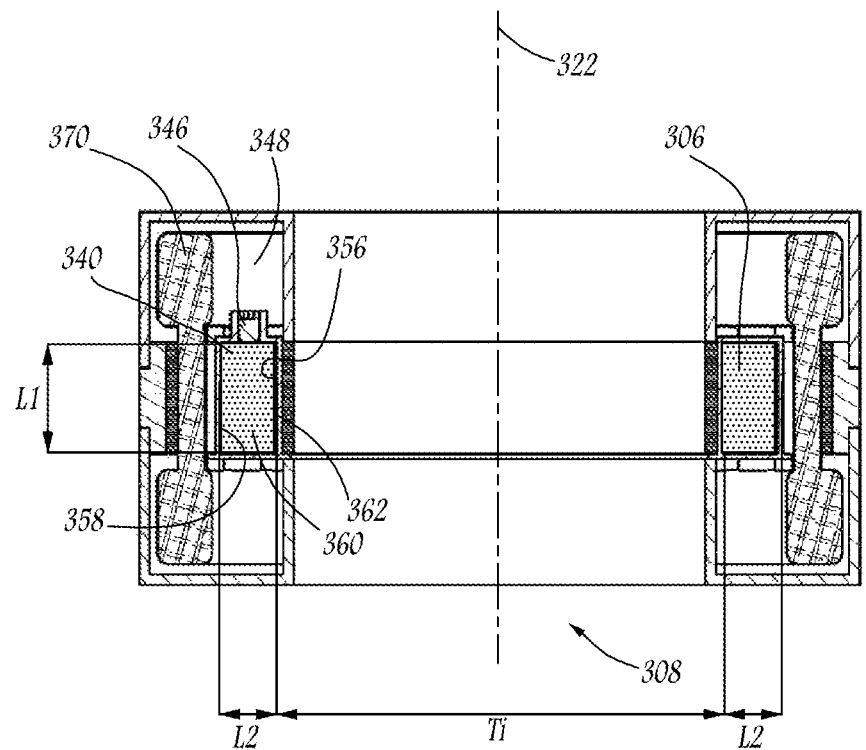
FIG. 7 is a sectional view of the inertial wheel of the inertial actuation magnetohydrodynamic wheel of FIG. 4 cut along the sectional plane VII-VII.

According to FIGS. 5 to 7, the fluid ring 306 has the shape of a second hollow torus, and includes a second central hole or ring hole 332, crossed by the same central axis 322 as that of the first torus, the internal cross section of the second hollow torus forming the fluid ring 306, along any radial half-plane having as a boundary the central axis 322, being rectangular.

Like the fluid rings 3 and 203 of the first and second embodiments, the rectangle forming the cross section of the fluid ring 306 is extended in length along the direction of the central axis 322 and in width along a radial direction relatively to the central axis 322.

The length of the rectangle designated by L1 is greater than the radial width, designated by L2.

Like the fluid rings 3 and 203 of the first and second embodiments, the fluid ring 306 has a radial internal size noted as Ti equal to the diameter of the second central hole 332, and the fluid ring 306 is totally filled with a conductive liquid of high density.

Orifices for filling 340 with liquid are made on at least one face of the fluid ring 306, for example the face 342 having as a normal, an axis parallel to the central axis 322.

Sealed lids 346 of the filling orifices 340 are provided in the inertial wheel 302.

Further, conduits 348 for bringing the conductive fluid are made so as to be accommodated inside the case 304 before closing the latter.

As an example, the fluid ring 306 is filled like in the first and second embodiments with liquid gallium, the operating temperature of the magnetohydrodynamic wheel being intended to be comprised in the range corresponding to the liquid state, i.e. between 30° C. and 200° C. under reduced pressure, a high temperature of 200° C. corresponding here to a maximum temperature supported by the walls of the fluid ring 306.

According to FIGS. 5 to 8, the single pump 308 is a magnetohydrodynamic pump with annular induction which comprises a first internal magnetic conduction element 352, a second external magnetic conduction element 354, and a means 355 for generating at least two magnetic fields.

The first internal magnetic conduction element 352 has a smooth annular global shape and is made with a first stack of magnetic metal tubes with non-oriented grains.

The second external magnetic conduction element 354 has an annular global shape and is made by a second stack of magnetic metal sheets with non-oriented grains.

The first and second magnetic conduction elements 352, 354 are positioned concentrically around the central axis 322, the axis for stacking the magnetic metal sheets of the first and second magnetic elements 352, 354 coincide with the central axis 322.

Each magnetic conduction element 352, 354 is separated as close as possible to the central axis 322 of the hole 332 of the fluid ring 306 by a set back distance of the magnetic conduction element which is specific to it, respectively designated by D1, D2.

The magnetohydrodynamic wheel 302 is configured so that the ratio of the set back distance of any magnetic conduction element taken from the first magnetic conduction element 352 and the second magnetic conduction element 354 of the single magnetohydrodynamic pump 308 over half of the internal radial size Ti of the fluid ring 306 is greater than or equal to 0.5, and preferably greater than or equal to 0.7.

The first and second magnetic conduction elements 352, 354 surround circumferentially as close as possible to the fluid ring 306, respectively with a first internal air gap face 356 and through a second external air gap face 358, the first internal air gap face 356 and the second external air gap face 358 forming a single magnetic air gap 360 for the pump 308.

The first internal air gap face 356 of the first magnetic conduction element 352 is radially positioned facing a first face 362 of the fluid ring 306, corresponding to an internal radius Ri of the fluid ring 306.

The second external air gap face 358 of the second magnetic conduction element 354 is radially positioned facing a second face 364 of the fluid ring 306, corresponding to an external radius Re of the ring 306.

The first and second radial faces 362, 364 of the fluid ring 306 delimits an air gap area 366 of the fluid ring 306.

The means 355 for generating a magnetic field having at least a pair of poles comprises windings of electric conductors, here in copper and globally illustrated by reference 370 in FIGS. 5 to 7, and the current power supply source 310 only illustrated in FIG. 4.

The windings of insulated conductor 370 are distributed all around the second magnetic conduction element 354 in the same way as for an external stator of an electromagnetic machine with standard asynchronous rotation.

The first and second magnetic conduction elements 352, 354, and the conductor windings 370 form a stator 372 of an asynchronous rotating machine, the fluid ring of the fluidic ring 306, being free to move around the central axis 322, forming the rotor of the asynchronous machine, in the same way as a standard squirrel cage.

Figure 8:
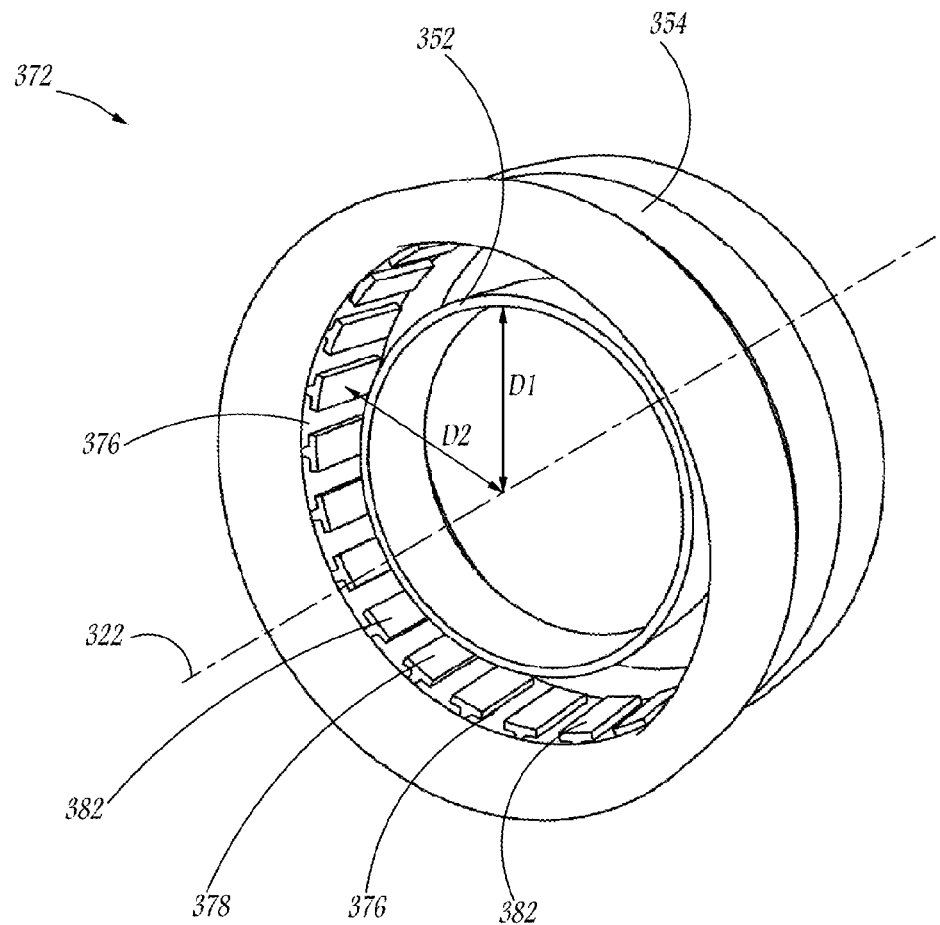
FIG. 8 is a perspective view of the elements for conducting magnetic fields, partly forming the stator of the magnetohydrodynamic pump of the wheel of FIGS. 4 to 7.

According to FIG. 8, longitudinal stator notches 376 are made radially and regularly on a cylindrical internal face 378 of the second magnetic conduction element 354.

As an example of the third embodiment, the windings of insulated conductors 370, not shown, are placed in 24 stator notches distributed in two identical groups of three multiple coils with two shifted coils.

In other words, the stator 372 of the magnetohydrodynamic pump 308 is formed by a quadripolar three-phase armature with two notches per phase and per pole.

Both groups produce two pairs of poles of the stator.

A same group of three coils is distributed along the circumference of the second magnetic conduction element 354 with an angular aperture of 180°.

The three coils of the same group are shifted 2×2 on the perimeter of the second magnetic conduction element 354 by an angle of 60°, are electrically distributed according to three phases of currents shifted in time relatively to each other, and are connected to the current power supply source 310, through three corresponding phase terminals.

The time phases of the three currents are phase-shifted 2×2 while circulating by 120° and the current power supply source is a three-phase power supply.

The current power supply source 310 is a power supply made as an example by associating a battery and a three-phase inverter with three output phases.

Two neighbouring coils having a same current phase are spaced out angularly by an angle equal to 180°.

Each coil, associated with a same pole and with a same current phase, is formed with two coils, shifted relatively to each other by an angle of 30° on the circumference of the second magnetic conduction element 354. The coil occupies four notches, laid out according to two adjacent pairs, each notch pair being spaced out by an angle of 60°.

It should be noted that in FIG. 8, the notches are delimited by teeth 382 cut out in the second magnetic conduction element 354, protruding and flaring towards the central axis 322, and having a circumferential end shape combined with the portion of the external face of the fluid ring 306 facing each other during the assembling of the inertial wheel 302. This corresponds to a smooth stator structure giving the possibility of producing a substantially uniform air gap with the fluid ring 306.

At a same operating instant t of the magnetohydrodynamic pump 308, three families of magnetic fields, alternating and phase-shifted by a time angle of 120°, resulting in a quadripolar magnetic field rotating at an angular velocity equal to the time angular velocity noted as ω of the currents delivered by the power supply divided by two.

In this example, the magnetohydrodynamic pump 308 comprises a single air gap 358 and four effective areas of the fluid ring for setting the conductive liquid into motion are active at the same time at a same instant t which corresponds to the positions of the four poles of the resulting quadripolar magnetic field, at the same instant t. Thus, the number of effective areas for setting the conductive liquid into motion may be considered as being very large or even infinite over a duration corresponding to one turn of the resulting magnetic field around the fluid ring.

At any operating instant t of the inertial wheel 308, the alternating magnetic flux developed as a result of the excitation of the conducting windings selects preferred flux paths with low reluctance including the material of the two magnetic conduction elements 352, 354 and thus crosses the air gap area 358 and the effective areas at this instant t of setting into motion along essentially radial directions.

When the magnetohydrodynamic wheel 302 operates, the fluid ring, i.e. the conductive liquid contained in the fluid ring is radially crossed by alternating magnetic fluxes in time equivalent to a rotating quadripolar magnetic flux. Induced eddy currents are generated in the conductive liquid under the action of the applied magnetic flux, which in turn generates reaction magnetic fields for which the interaction with the applied magnetic fields of the stator provides resulting dynamic torques around the central axis 322, i.e. a dynamic correction momentum or a reaction momentum.

Stable coupling is established for a speed of rotation of the conductive liquid synchronous with the speed of rotation of the resulting quadripolar magnetic field.

If ω designates the angular velocity of the three-phase current, the speed of rotation of the resulting quadripolar magnetic field is equal to ω/2, and the speed of rotation of the liquid is expressed as (1-s) times ω/2 wherein s is a real number, less than 1 and called the slip.

The current power supply source may be modulated over time in terms of the frequency and of the intensities of the currents through controlled signals received on one or several control terminals.

According to FIG. 4, the regulation circuit 312 is connected to the current power supply source 310 through one or several connections not shown.

The regulation circuit 312 is configured for modulating the frequency and the intensities of the phase currents crossing the coils of the stator so as to minimise the electric energy consumed by the single magnetohydrodynamic pump when the metal fluid rotates at a predetermined set rotational velocity.

The embodiment of FIGS. 4 to 8 may be generalised in the following way.

The windings of insulated conductors are placed in stator notches and distributed in an integer number p of groups identical with an integer number of q multiple windings with n shifted coils.

The number p designates the number of pairs of the poles of the stator. The integer number q designates the number of current phases, and the integer number $\underline{n}$ designates the number of notches per phase and per pole.

A same group of q windings is distributed according to the circumference of the first magnetic conduction element with an angular aperture of 360/p degrees.

The q windings of a same group are shifted 2×2 by an angle of 360/p*q degrees.

The windings of the electric conductors are distributed according to current phases time shifted relatively to each other, and are connected to the current power supply source, through corresponding phase terminals.

The time phases of the q currents are phase-shifted 2×2 while circulating by 360/q degrees and the current power supply source is a multiple phase current power supply source which includes q phase terminals.

The multi-phase current power supply source may be produced by means of a rotating electromechanical machine or be derived from an association of a current or voltage source and/or of transformers and/or of power converting electronic circuits.

The current power supply source is preferably achieved by associating a battery and a multiphase inverter with q output phases.

Two neighbouring windings having a same current phase are angularly spaced apart by an angle equal to 360/p degrees.

At a same operating instant $\underline{t}$ of the magnetohydrodynamic pump, q families of magnetic fields, alternating and phase shifted by a time angle of 360/q degrees, resulting in a p-polar magnetic field rotating at an angular velocity equal to the time angular velocity of ω of the currents delivered by the power supply divided by the number of p of pairs of poles.

The number of phases q of currents is any integer greater than or equal to 2.

The number p of pairs of poles is any integer.

The number of notches per phase and per pole is any integer.

In an alternative construction of the stator, the distribution of the conductive windings is applied on the first magnetic conduction element instead of a second conduction element. This alternative is of interest provided that the size of the room available in the central hole of the inertial wheel remains sufficient.

Generally, encompassing the first, second and third embodiments, a magnetohydrodynamic inertial wheel, intended to correct as an actuator a variation of an attitude angle of a platform, comprises a fluid ring, and at least one magnetohydrodynamic pump.

The fluid ring, with a torus shape includes a hole of a central ring crossed by central axis, having an internal size equal to the diameter of the ring hole.

The fluid ring is filled with a dense conductive liquid and has at least one air gap area capable of being crossed by one or more magnetic fields and has at least one effective area for setting the liquid into motion.

Each magnetohydrodynamic pump includes a single and different magnetic air gap, the magnetic air gap surrounding a single and different air gap area and effective areas for setting into motion included in the air gap area.

Each magnetohydrodynamic pump includes a single and different means for generating magnetic field(s) crossing the associated magnetic air gap and includes at least one single and different magnetic conduction element, configured for conducting and channelling the magnetic field(s) generated in the effective area(s) for setting into motion, each magnetic conduction element being separated as close as possible to the central axis of the hole of the ring by a set back distance of the magnetic circuit which is specific to it.

The ratio of the set back distance of any magnetic conduction element of any magnetohydrodynamic pump over half of the internal size of the fluid ring is greater than or equal to 0.5, preferably greater than or equal to 0.7.

The conductive liquid is a liquid taken from the set formed by liquid gallium, liquid mercury, and NaK.

Generally, the magnetic conduction elements are made by stacking magnetic metal sheets with non-oriented grains or by moulding a sintered magnetic material alone or in a composite. The conductive windings are coils with wires or with strips wound around, on or in the conduction elements.

Generally, a radial section of the internal envelope of the fluid ring is comprised in the set formed by circles, ellipses, rectangles, squares, rectangles with rounded angles, squares with rounded angles, polygons, polygons with rounded angles and combinations of several of these geometrical shapes.

Alternatively, the envelope of the fluid ring is deformable and elastic in radial section. Thus, if the conductive liquid is a metal which expands upon passing from the liquid state to the solid state, the envelope of the ring is able to support the expansion of the metal in the solid state, and to avoid bubbles when the metal, heated by the eddy currents of the operating magnetohydrodynamic pump(s) becomes again liquid. It should be noted that providing at least two effective areas for setting the conductive liquid into motion, sufficiently dispersed, improves the efficiency of the heating of the solid conducting metal in the fluid ring.

For example, the envelope of the fluid ring is made deformable and elastic by providing circumferential extension folds on one or several corners of the polygon forming the contour of the radial section of the fluid ring, these folds acting in a similar way to bellows.

Figure 9:
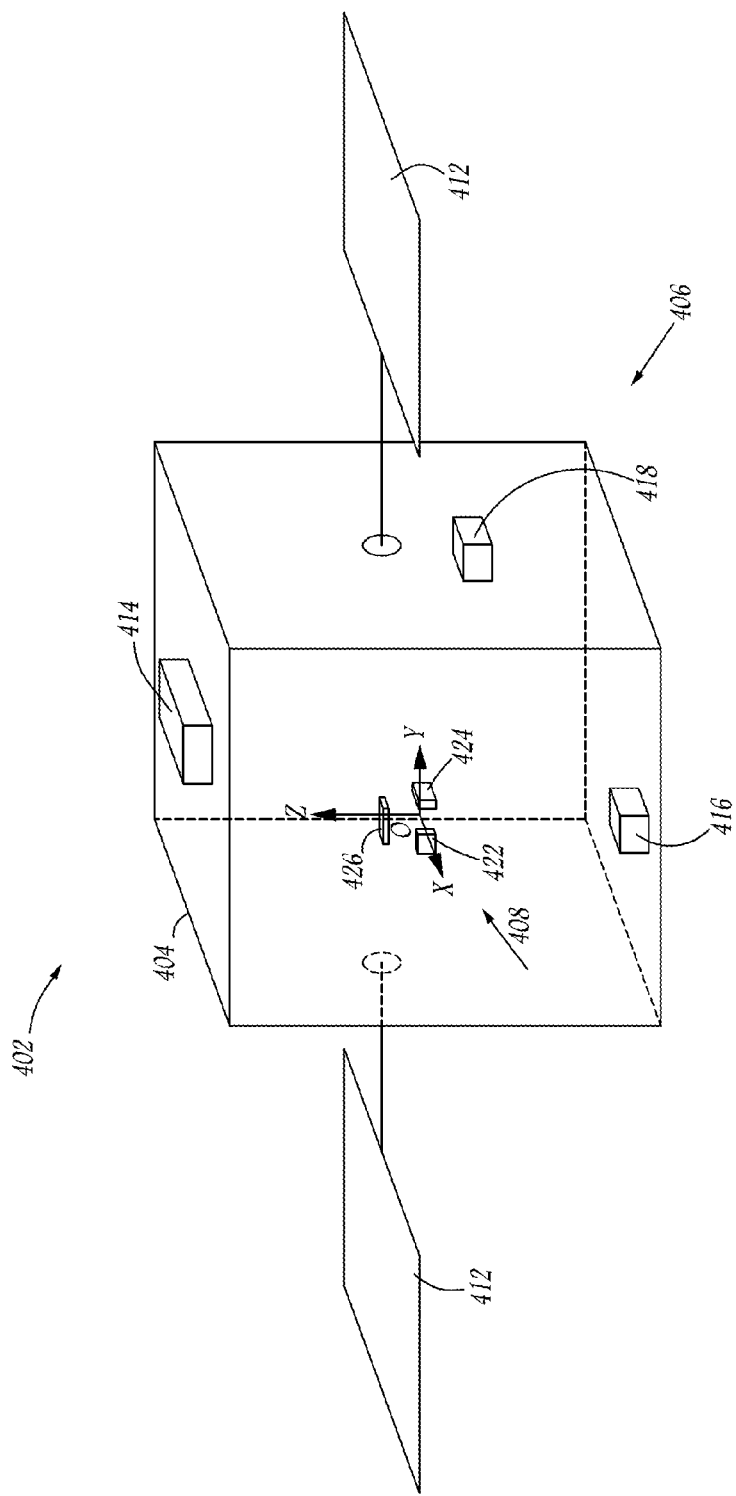
FIG. 9 is a view of a satellite, the platform of which integrates three magnetohydrodynamic wheels for inertial actuation of the type described in any of FIGS. 1 to 8.

According to FIG. 9, a satellite 402 comprises a platform 404, one or several pieces of massive equipment 406 positioned on or anchored to the platform 404 and an Attitude and Orbit Control sub-System 408 (AOCS).

Anchored pieces of equipment 406 are for example solar panels 412 and an antenna 414 schematically illustrated by a box.

Massive pieces of equipment 406 positioned on the platform are for example boxes 416, 418 filled with electronic components.

The Attitude and Orbit Control Sub-System 408 (AOCS) comprises three magnetohydrodynamic wheels 422, 424, 426 attached to the platform 404 for example having a structure as described above, configured for stabilising the satellite 402 as inertial actuators for stabilising the satellite 402.

According to FIG. 9, the inertial axes X, Y, Z of the magnetohydrodynamic wheels 422, 424, 426, i.e. the central axes crossing the associated fluid rings are orthogonal 2×2 so that the whole forms a triaxial stabilisation system.

The size of each of the magnetohydrodynamic wheels on board the satellite is comprised between 10 centimeters and 10 meters.

Alternatively, the satellite 402 comprises at least one magnetohydrodynamic wheel according to the invention.

Alternatively, at least one magnetohydrodynamic wheel 422, 424, 426 has a central hole in which are positioned part or the whole of the massive equipment.

An inertial actuation magnetohydrodynamic wheel or inertial actuator as described above is configured for producing either a kinetic wheel, or a reaction wheel, or a gyroscopic actuator.

The kinetic wheel in addition to its capability of providing a reaction torque (generally small), gives the possibility by a larger speed of rotation of the conductive liquid of loading significant kinetic energy, and of keeping a fixed direction in an inertial reference system in the absence of perturbating torques. In other words, the kinetic wheel gives gyroscopic stiffness to the platform.

The reaction wheel essentially provides a reaction torque by modifying the speed of rotation of the conductive fluid. In this case, it is sought to minimise the kinetic energy in order to avoid the transverse torques induced by a gyroscopic effect.

The gyroscopic actuator or gyrocoupler (designated also as Control Moment Gyro) gives the possibility of producing a high gyroscopic torque not by accelerating or decelerating the wheel but by tilting it. Thus a variation of angular momentum is thereby generated which is expressed by a torque perpendicular to the angular momentum of the wheel and to the rotational velocity vector which is applied to it.

Magnetohydrodynamic wheels according to the invention may be used for example as an element for stabilising a camera when the size of the wheel is comprised between 1 cm and 10 cm.

Magnetohydrodynamic wheels may be used as accurate stabilising or accurate pointing elements of a satellite of any size ranging from that of a nano-satellite to that of a big geostationary satellite, as a natural stabilisation element of a space probe, or of an aerospace craft such as a nacelle suspended from a balloon. In this case, the size of the wheel is comprised between 10 cm and 10 meters.

Magnetohydrodynamic wheels may be used as an accurate stabilisation element of a space station or of a space craft of large size, the size of the wheels being comprised between 10 meters and a few hundred meters.

Generally, a platform stabilised in attitude comprises a supporting structure, one or several massive pieces of equipment positioned on the supporting structure, and at least one magnetohydrodynamic inertial wheel as defined above.

The size of any of the magnetohydrodynamic wheels is comprised between a few centimeters and a few hundred meters.

The expression above according to which both radial middle half-planes of two of the effective areas are angularly spaced out by at least 120° means that the inward angle and the protruding angle of two radial middle half-planes of two from among the effective areas are each greater than or equal to 120°.

The invention claimed is:

1. An inertial actuator for pointing a platform along a predetermined direction comprising:
    a fluid ring having a torus shape around a central axis, the fluid ring including a central ring hole having a diameter, the central ring hole crossed by a central axis, the fluid ring having an internal size equal to the diameter of the central ring hole, the fluid ring being filled with a conductive liquid, the fluid ring having at least one air gap portion which is defined as a portion crossed by a magnetic field, and at least one effective portion which is defined as a portion where the conductive liquid is set into motion;
    at least one magnetohydrodynamic pump for setting the conductive liquid into motion around the central axis of the fluid ring,
    each magnetohydrodynamic pump having only one air gap, the air gap being associated with one air gap portion of the fluid ring and with the at least one effective portion of the fluid ring that is located inside the air gap portion,
    each magnetohydrodynamic pump including only one means for generating a magnetic field through the air gap thereof, and including a magnetic conduction element which, conducts and channels the magnetic field through the at least one effective area portion and is separated from the central axis by a set back distance; and
    a synchronization circuit, connected to each pump of the at least one magnetohydrodynamic pump and configured for synchronising an amplitude of the magnetic field generated by each pump of the at least one magnetohydrodynamic pump so as to minimise an energy consumed by the at least one magnetohydrodynamic pump when the conductive liquid rotates at a predetermined rotational speed,
    wherein the ratio of the set back distance of the magnetic conduction element over the half of the internal size of the fluid ring is greater than or equal to 0.5 and wherein the fluid ring comprises a number P of effective portions, P being an integer greater than or equal to two, each effective portion being centered around a radial middle half-plane, one radial middle half-plane being angularly spaced apart from the next radial middle half-plane by a pitch, said pitch being equal to 360° divided by the number P of effective portions.

2. The inertial actuator according to claim 1, wherein each pump of the at least one magnetohydrodynamic pump is a pump selected from the set formed by DC current conduction electromagnetic pumps, AC current conduction electromagnetic pumps, linear induction electromagnetic pumps, annular induction electromagnetic pumps, and spiral induction electromagnetic pumps.

3. The inertial actuator according to claim 1, comprising at least two distinct magnetohydrodynamic pumps, each magnetohydrodynamic pump being associated with only one air gap portion.

4. The inertial actuator according to claim 1 comprising only one magnetohydrodynamic pump which is an annular induction magnetohydrodynamic pump in which the means for generating the magnetic field is an electromechanical machine stator having several windings positioned around the central axis and along an external circumference of the fluid ring and connected to a multi-phase current source for generating alternating radial unipolar or multipolar magnetic fields that form a resulting multipolar rotating magnetic field having a number P of poles, regularly distributed angularly, and
    the fluid ring comprising the number P of effective portions each effective portion being centered around a respective radial middle half-plane, which coincides with an axis of a pole of the resulting multipolar rotating magnetic field.

5. The inertial actuator according to claim 4, further comprising a unit for regulating a frequency of an amplitude of the current provided by the multi-phase current source in order to minimise the energy consumed by the magnetohydrodynamic pump when the conductive liquid rotates at the predetermined set rotational speed.

6. The inertial actuator according to claim 1, wherein the conductive liquid is a liquid selected from the group consisting of liquid gallium, liquid mercury and NaK.

7. The inertial actuator according to claim 1, wherein a shape of a radial section of an envelope of the fluid ring is selected from the group consisting of circles, ellipses, rectangles, squares, rectangles with rounded angles, squares with rounded angles, polygons, polygons with rounded angles and combinations thereof.

8. The inertial actuator according to claim 1, wherein each pump of the at least one magnetohydrodynamic pump comprises only one magnetic conduction element having a first polar end and a second polar end positioned on either side of the air gap in order to form, with the air gap, a closed magnetic circuit.

9. The inertial actuator according to claim 1, wherein each pump of at least one magnetohydrodynamic pump comprises a first magnetic conduction magnetic element, the first and a second magnetic conduction elements being positioned on either side of the air gap in order to form a series with the air gap and the means for generating the magnetic field, a closed magnetic circuit.

10. A platform comprising a supporting structure, one or several massive pieces of equipment positioned on the supporting structure, and at least one inertial actuator according to claim 1, and wherein the size of each of the at least one inertial actuators is between 20 centimeters and three hundred meters.

11. The platform according to claim 10, wherein the at least one inertial actuator is
    a kinetic wheel for giving a gyroscopic stiffness to the platform,
    a reaction wheel for changing an angular momentum or a kinetic energy of the platform around a minimum value, or
    a gyroscopic actuator for strongly changing an angular momentum of the platform.

* * * * *